United States Patent
Tokunaga et al.

(10) Patent No.: US 7,951,491 B2
(45) Date of Patent: May 31, 2011

(54) POSITIVE ELECTRODE AND LITHIUM ION SECONDARY BATTERY

(75) Inventors: Takashi Tokunaga, Fukushima (JP); Yoshiaki Obana, Kanagawa (JP); Toshikazu Nakaura, Fukushima (JP); Hiroyuki Akashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/263,985

(22) Filed: Nov. 3, 2008

(65) Prior Publication Data

US 2009/0117465 A1    May 7, 2009

(30) Foreign Application Priority Data

Nov. 6, 2007 (JP) ................... 2007-288408

(51) Int. Cl.
*H01M 4/62* (2006.01)
*H01M 4/50* (2006.01)
*H01M 4/52* (2006.01)

(52) U.S. Cl. ......... 429/232; 429/217; 429/223; 429/224

(58) Field of Classification Search ................... 429/223, 429/218, 231, 224, 314, 211, 217, 226, 232; 423/445; 428/323; 246/29.5
See application file for complete search history.

(56) References Cited

U.S. PATENT DOCUMENTS

| | | | | |
|---|---|---|---|---|
| 4,882,103 A | * | 11/1989 | Kawakubo et al. | 264/29.5 |
| 5,582,909 A | * | 12/1996 | Watanabe et al. | 428/323 |
| 5,882,621 A | * | 3/1999 | Doddapaneni et al. | 423/445 R |
| 2002/0015894 A1 | * | 2/2002 | Wariishi et al. | 429/314 |
| 2002/0059719 A1 | * | 5/2002 | Hosoya et al. | 29/623.1 |
| 2005/0058589 A1 | * | 3/2005 | Lundquist et al. | 423/445 R |
| 2010/0190056 A1 | * | 7/2010 | Turner et al. | 429/211 |

FOREIGN PATENT DOCUMENTS

| | | | |
|---|---|---|---|
| JP | 63 121 247 | | 5/1988 |
| JP | 2000 133271 | | 5/2000 |
| JP | 2002279989 A | * | 9/2002 |
| JP | 2003 317722 | | 11/2003 |
| JP | 2004 247292 | | 9/2004 |
| JP | 3598153 | | 9/2004 |
| JP | 2005 251554 | | 9/2005 |
| JP | 2005 327630 | | 11/2005 |
| JP | 2005-332809 | | 12/2005 |
| JP | 2005-353584 | | 12/2005 |
| JP | 2006 040800 | | 2/2006 |
| JP | 2007 19108 | | 1/2007 |
| JP | 2007 67088 | | 3/2007 |
| JP | 2007-242318 | | 9/2007 |

OTHER PUBLICATIONS

Machine translation of JP 2002-279989 A, Fujita et al., Sep. 2002.*
"On the solvent soluable constituents originally existing in Zao Zhung coal", Iino, Masashi, et al., Fuel, vol. 70, Issue 10, Oct. 1991, pp. 1236-1237.*

(Continued)

*Primary Examiner* — Jonathan Crepeau
*Assistant Examiner* — Kenneth Douyette
(74) *Attorney, Agent, or Firm* — K&L Gates LLP (57) ABSTRACT

A positive electrode includes a collector and a positive electrode mixture layer formed on the collector and containing a polyacrylonitrile based resin-containing binder and a positive electrode active material. The polyacrylonitrile in the positive electrode mixture layer is crosslinked and carbonized.

9 Claims, 4 Drawing Sheets

OTHER PUBLICATIONS

"Continuous Carbonization of Polyacrylonitrile-based Oxidized Fibers: Aspects on Mechanical Properties and Morphological Structure", Liu et al., Journal of Applied Polymer Science, vol. 52, P945-950, 1994.*

"Low-Cost Carbon Fibers from Coal-Based Precursors", MER Corporation, Tucson, AZ, 1999.*

Certified English translation of Fujita et al. (JP 2002-279989).*

"Synthesis and Electrochemical Characterization of LiMn2O4 Cathode Materials for Lithium Polymer Batteries", Sawtschenko et al., Synthetic Metals, vol. 47, Issue 3, P287-296, Jun. 1, 1992.*

"Highly porous thermally structurized polyacrylonitrile", Sun et al., Korean Journal of Chemical Engineering, 16(4), P449-450, 1999.*

Japanese Office Action issued on Jan. 5, 2010, for corresponding Japanese Patent Application JP 2007-288408.

* cited by examiner

POSITIVE ELECTRODE AND LITHIUM ION SECONDARY BATTERY

CROSS REFERENCES TO RELATED APPLICATIONS

The present application claims priority to Japanese Patent Application JP 2007-288408 filed in the Japan Patent Office on Nov. 6, 2007, the entire contents of which being incorporated herein by reference.

BACKGROUND

The present application relates to a positive electrode which is favorably used for, for example, a lithium ion secondary battery, and the like and to a lithium ion secondary battery to which such a positive electrode is applied.

In recent years, following diffusion of portable information electronic devices such as mobile phones, video cameras and laptop personal computers, it is rapidly advanced to realize high performance, downsizing and weight saving of these devices.

As a power source to be used for these devices, disposable primary batteries and repeatedly usable secondary batteries are used. From the viewpoint of favorable comprehensive balance among economy, performance, downsizing, weight saving and the like, among these secondary batteries, lithium ion secondary batteries have been increasingly demanded.

In particular, in recent years, in order to realize higher performance of portable information electronic devices, not only high energy density of a lithium ion secondary battery but also enhancement of cycle properties is required.

First of all, as to the high energy density of a lithium ion secondary battery, it is one of effective methods to use a positive electrode having a high discharge capacity per unit volume. In order to realize such a positive electrode, it is known that (a) selection of an active material and (b) an increase of charge upper limit voltage are important. In recent years, studies for attaining high energy by increasing a charge upper limit voltage are eagerly made.

As a positive electrode active material of lithium ion secondary battery, in addition to $LiCoO_2$, etc., $LiNiO_2$, $LiMn_2O_4$ and the like are known.

Here, since $LiNiO_2$ has a relatively high capacity of about 190 $mAhg^{-1}$, it is necessary to decrease a discharge cutoff voltage for the purpose of obtaining the capacity. However, it may be said that since $LiNiO_2$ is low in average voltage, it is unsuitable for applications requiring a high electric power such as an application to a laptop personal computer. Also, $LiMn_2O_4$ is low in capacity so that it is unsuitable for attaining a high energy density of lithium ion secondary battery.

For these reasons, as to a high charge voltage lithium ion secondary battery having an application to a laptop personal computer, it may be said that $LiCoO_2$ which has a high average discharge voltage is especially desirable among the foregoing lithium-containing transition metal oxides.

In a lithium ion secondary battery using $LiCoO_2$ as a positive electrode active material and a carbon material as a negative electrode active material, its charge final voltage is from 4.1 V to 4.2 V. Under such a charge condition, the positive electrode is utilized only in a proportion of from about 50% to 60% relative to the theoretical capacity.

Accordingly, if the charge voltage can be increased, it becomes possible to utilize the capacity of the positive electrode in a proportion of 70% or more relative to the theoretical capacity, and it becomes possible to attain a high capacity and a high energy density of the lithium ion secondary battery.

Actually, for example, as disclosed in WO 03/019731, it is known that by increasing the voltage at the time of charge to 4.30 V or more, a high energy density can be revealed.

On the other hand, as to an enhancement of cycle properties, in a lithium ion secondary battery, a material obtained by coating a positive electrode mixture composed of a positive electrode active material (for example, lithium-containing transition metal composite oxides, etc.), a binder (for example, fluorocarbon resins, etc.), a conductive agent and the like on an aluminum foil as a collector is used.

However, the present inventors set up the charge voltage of an existing lithium ion secondary battery working at 4.2 V at maximum so as to exceed 4.20 V. As a result, it has become clear that there is a problem inherent to the battery of such a system that the discharge amount which can be extracted per cycle is lowered.

As causes of this, there may be considered plural factors including an increase of electron transfer resistance due to a lowering of the contact area of the active material, conductive agent and collector, modification of an electrolytic solution and an increase of diffusion resistance due to an increase of the surface coating film. Among these factors, as to the increase of electron transfer resistance due to a lowering of the contact area of the active material, conductive agent and collector, the matter that the adhesion of the positive electrode mixture in a highly oxidative atmosphere is lowered by increasing an upper limit voltage of charge may be considered to be one of the factors.

Actually, in a battery using a PVDF (polyvinylidene fluoride) binder which is a fluorocarbon resin, a charge-discharge cycle was carried out at an upper limit voltage of 4.2 V and at a charge voltage higher than the upper limit voltage of 4.2 V; after the charge-discharge cycle, the battery was taken apart; and the positive electrode was taken out. As a result, it was confirmed that in the case of carrying out the charge-discharge cycle at a charge voltage higher than 4.2 V, peeling between the positive electrode mixture and the collector was remarkable.

As described above, in the PVDF binder which is a fluorocarbon resin, it has become clear that the adhesion of the positive electrode mixture is lowered and that in case of carrying out a charge-discharge cycle at a charge voltage higher than the upper limit voltage of 4.2 V, the cycle properties are noticeably deteriorated.

Then, for the purpose of improving resistance to peeling of the positive electrode mixture and the collector, the present inventors paid attention to a polyacrylonitrile resin from which a higher adhesive force is obtainable and found that the cycle properties at a high temperature tend to be enhanced by using such a highly adhesive binder.

An example using polyacrylonitrile as a binder for electrode is found in JP-A-2006-40800, and it is disclosed therein that an electrode having excellent pliability and flexibility can be thus manufactured.

SUMMARY

However, in view of the matter that following high capacity of the battery and thick coating of the positive electrode mixture, the cycle properties tend to be further deteriorated, when only a polyacrylonitrile resin is merely used, the tendency of deterioration to be caused due to high capacity and thick coating could not be covered. In order to obtain sufficient cycle properties, there was involved a problem that a further improvement is necessary.

In view of the foregoing, it is desirable to provide a positive electrode which is excellent in adhesion of a positive electrode mixture, which even when a charge-discharge cycle is carried out at a high charge voltage, does not peel apart from a collector, and which is able to enhance cycle properties of a battery; and a lithium ion secondary battery to which such a positive electrode.

In an embodiment, a polyacrylonitrile based resin-containing binder as a binder for positive electrode mixture and crosslinking and carbonizing the polyacrylonitrile to be contained in the binder is provided.

That is, a positive electrode according to an embodiment is a positive electrode includes a collector and a positive electrode mixture layer formed on the collector and containing a polyacrylonitrile based resin-containing binder and a positive electrode active material, wherein the polyacrylonitrile in the positive electrode mixture layer is crosslinked and carbonized.

Also, a lithium ion secondary battery according to an embodiment includes a positive electrode, a negative electrode and an electrolyte, wherein the positive electrode includes a collector and a positive electrode mixture layer formed on the collector and containing a polyacrylonitrile based resin-containing binder and a positive electrode active material, and the polyacrylonitrile in the positive electrode mixture layer is crosslinked and carbonized.

According to an embodiment, since the polyacrylonitrile to be contained as a binder in the positive electrode mixture layer is crosslinked and carbonized, the adhesion of the positive electrode mixture is enhanced, and the peel strength between the collector and the positive electrode mixture layer is improved, whereby cycle properties of the battery can be enhanced.

Additional features and advantages are described herein, and will be apparent from the following Detailed Description and the figures.

DETAILED DESCRIPTION

A positive electrode and a lithium ion secondary battery according to an embodiment are hereunder described in detail. In the present specification, the term "%" is a mass percentage unless otherwise indicated.

The positive electrode according to one embodiment is favorably used for, for example, a lithium ion secondary battery and as described previously, includes a collector and a positive electrode mixture layer formed on the collector and containing a polyacrylonitrile based resin-containing binder and a positive electrode active material, and the polyacrylonitrile in the positive electrode mixture layer is crosslinked and carbonized.

Here, the crosslinking and carbonization of the polyacrylonitrile to be contained as a binder in the positive electrode mixture layer can be carried out by, for example, coating a positive electrode mixture slurry on a collector and then heat treating the coated collector at a temperature in the range of from 180° C. to 230° C.

At that time, when the treatment temperature is lower than 180° C., there is a possibility that the polyacrylonitrile cannot be sufficiently modified and that the peel strength between the positive electrode mixture layer and the collector cannot be sufficiently enhanced. Conversely, when the treatment temperature exceeds 230° C., there is a possibility that flexibility as an electrode tends to be hindered. The crosslinking and carbonization of the polyacrylonitrile can be confirmed by, for example, measuring FT-IR (Fourier transform infrared spectroscopy) as described later.

The lithium ion secondary battery according to one embodiment is provided with the foregoing positive electrode, a negative electrode and an electrolyte. By employing the foregoing configuration and improving the peel strength, in a lithium ion secondary battery which prevents a lowering of the adhesion of the positive electrode mixture in a highly oxidative atmosphere by increasing an upper limit voltage of charge and in which an open circuit voltage per single cell in a filly charged state is 4.25 V or more and not more than 4.55 V, good cycle properties can be obtained especially in high-load charge and discharge.

First Embodiment

An embodiment is hereunder described with reference to the accompanying drawings. In a First Embodiment, a lithium ion secondary battery which is provided with a positive electrode, a negative electrode and a non-aqueous electrolyte and in which an open circuit voltage per single cell in a fully charged state is 4.25 V or more and not more than 4.55 V has characteristic features that a positive electrode mixture layer thereof contains a polyacrylonitrile based resin-containing binder and that the polyacrylonitrile to be contained in the positive electrode mixture layer is crosslinked and carbonized.

The "fully charged state" as referred to herein means a final state when charge is carried out at a current value of not more than 0.5 C or a constant current-constant voltage system (in a constant voltage part, the voltage is cut at a current value of not more than 0.1 C). "C" is charge current value (mA)/battery capacity or electrode capacity (mA). Also, a charge potential of the positive electrode in a filly charged state can be measured by, for example, making a hole through which the electrolytic solution can go in and out in the battery, immersing this battery in a testing cell having the electrolytic liquid injected therein and using lithium as a reference electrode.

For example, when a carbon material having a charge potential of the negative electrode in a fully charged state of 0.1 V (vs. $Li/Li^+$) is used, the lithium ion secondary battery according to this embodiment is charged at a charge final voltage of 4.35 V or more.

Figure 1:
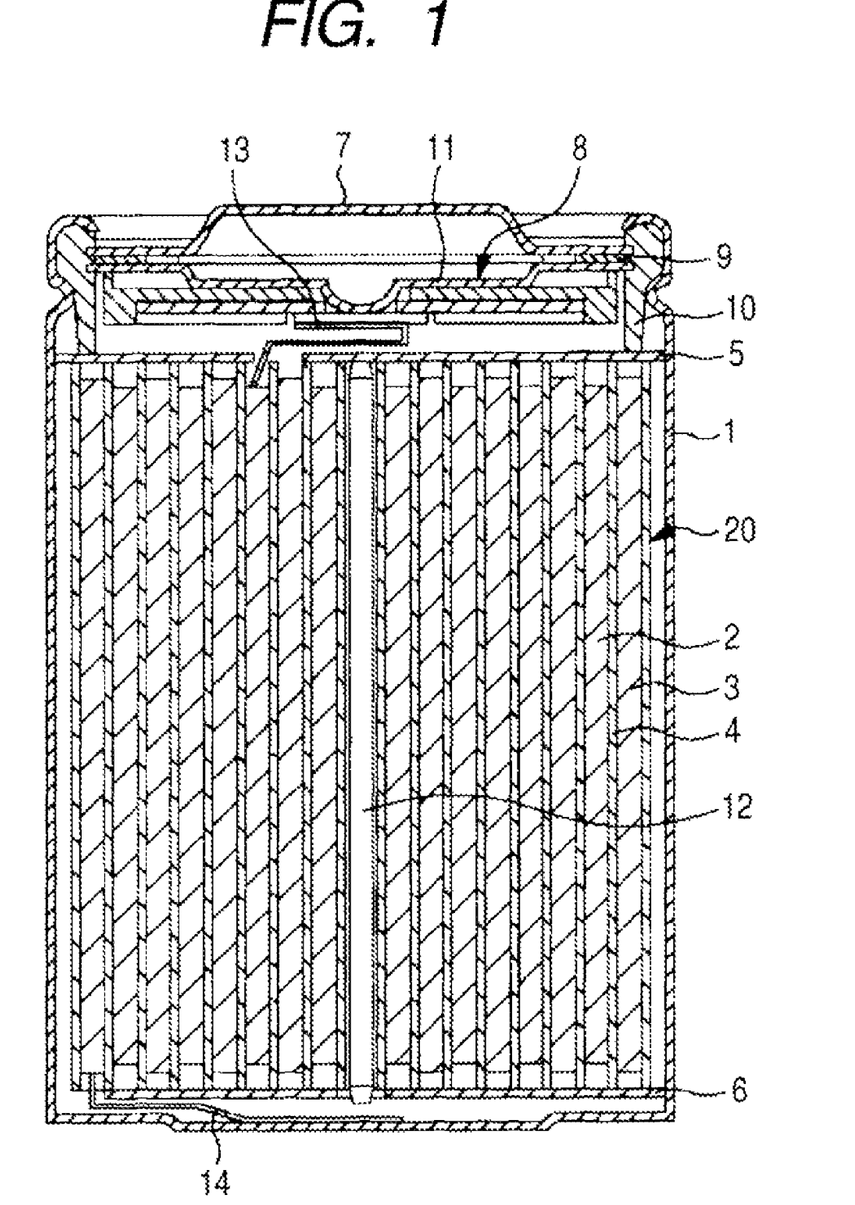
FIG. 1 is a vertical cross-sectional view showing a First Embodiment of a lithium ion secondary battery according to an embodiment.

FIG. 1 is a vertical cross-sectional view showing a cross-sectional structure of the lithium ion secondary battery according to the First Embodiment.

This battery is of a so-called cylindrical type and is provided with a wound electrode body 20 in which a strip-shaped positive electrode 2 and a strip-shaped negative electrode 3 are wound via a separator 4 in the inside of a substantially hollow columnar battery can 1.

The battery can 1 is constituted of, for example, nickel (Ni)-plated iron (Fe), and one end thereof is closed, with the other end being opened. A pair of insulating plates 5 and 6 is disposed in the inside of the battery can 1 vertically against the wound peripheral surface such that the wound electrode body 20 is interposed from the up and bottom.

In the open end of the battery can 1, a battery lid 7 is installed by caulking with a safety valve mechanism 8 and a positive temperature coefficient element (PTC element) 9 provided in the inside of this battery lid 7 via a gasket 10, and the inside of the battery can 1 is sealed. The battery lid 7 is constituted of, for example, the same material as in the battery can 1.

The safety valve mechanism 8 is electrically connected to the battery lid 7 via the positive temperature coefficient element 9, and in the case where the pressure in the inside of the battery becomes a fixed value or more due to an internal short circuit or heating from the outside or the like, a disc plate 11 is reversed, whereby electrical connection between the battery lid 7 and the wound electrode body 20 is disconnected.

When the temperature rises, the positive temperature coefficient element 9 controls a current due to an increase of a resistance value, thereby preventing abnormal heat generation to be caused due to a large current. The gasket 10 is constituted of, for example, an insulating material, and asphalt is coated on the surface thereof.

The wound electrode body 20 is wound centering on, for example, a center pin 12. A positive electrode lead 13 made of aluminum, etc. is connected to the positive electrode 2 of the wound electrode body 20; and a negative electrode lead 14 made of nickel, etc. is connected to the negative electrode 3.

The positive electrode lead 13 is welded to the safety valve mechanism 8, whereby it is electrically connected to the battery lid 7; and the negative electrode lead 14 is welded to the battery can 1, whereby it is electrically connected thereto.

Figure 2:
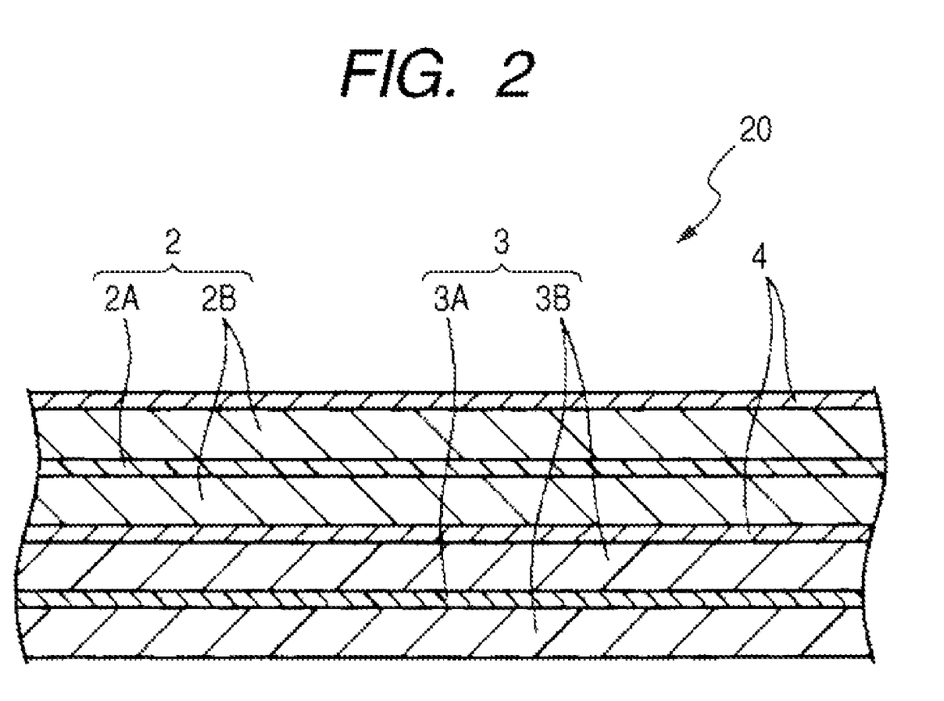
FIG. 2 is an enlarged cross-sectional view of a part of the wound electrode body as illustrated in FIG. 1.

FIG. 2 is an enlarged cross-sectional view of a part of the wound electrode body 20 as illustrated in FIG. 1. As illustrated in FIG. 2, the positive electrode 2 has, for example, a structure in which a positive electrode mixture layer 2B is provided on the both surfaces of a strip-shaped positive electrode collector 2A.

On the other hand, the negative electrode 3 has a structure in which a negative electrode mixture layer 3B is provided on the both surfaces of a strip-shaped negative electrode collector 3A. These positive electrode 2 and negative electrode 3 are opposing to each other via the separator 4.

[Positive Electrode]

The positive electrode 2 can be obtained by coating a positive electrode mixture obtained by mixing a positive electrode active material, a conductive agent, a binder and the like on the surface of the collector 3.

Specifically, the positive electrode 2 can be prepared by coating a positive electrode mixture slurry composed of a powdered positive electrode active material, a conductive agent, a binder and a solvent or dispersion medium of the binder on the positive electrode collector 2A, for example, an aluminum foil, etc., drying and press rolling, thereby forming the positive electrode mixture layer 2B on the positive electrode collector 2A.

The positive electrode active material is not particularly limited so far as it is a positive electrode material capable of occluding and releasing lithium. It is preferable to use a positive electrode active material in which a coating layer composed of an oxide containing lithium (Li) and at least one coating element of nickel (Ni) and manganese (Mn) is provided on at least a part of a composite oxide particle.

According to this, it is possible to provide a battery capable of realizing high charge voltage properties and high energy density properties following them and having good charge-discharge cycle properties under a high charge-discharge voltage condition.

The composite oxide particle (core particle to be coated) which constitutes the positive electrode active material contains at least lithium (Li) and cobalt (Co), and for example, one having an average composition represented by the following formula is preferable. By using such a composite oxide particle, high capacity and high discharge potential can be obtained.

$$Li_{(1+x)}Co_{(1-y)}M_yO_{(2-z)}$$

In the formula, M represents at least one element selected from the group consisting of magnesium (Mg), aluminum (Al), boron (B), titanium (Ti), vanadium (V), chromium (Cr), manganese (Mn), iron (Fe), nickel (Ni), copper (Cu), zinc (Zn), molybdenum (Mo), tin (Sn), calcium (Ca), strontium (Sr), tungsten (W), yttrium (Y) and zirconium (Zr); and x, y and z are each a value falling within the ranges of $(-0.10 \leq x \leq 0.10)$, $(0 \leq y < 0.50)$ and $(-0.10 \leq z \leq 0.20)$, respectively.

In this formula, as described previously, though the range of x is $(-0.10 \leq x \leq 0.10)$, it is preferably $(-0.08 \leq x \leq 0.08)$, and more preferably $(-0.06 \leq x \leq 0.06)$. When x is smaller than this range, the discharge capacity is reduced. On the other hand, when x is larger than this range, Li is diffused into the outside of the particle, thereby causing an obstacle in controlling the basicity in the next treatment step. Finally, such becomes a cause of harmful influence against the acceleration of gelation in kneading a positive electrode paste.

Also, though the range of y is, for example, $(0 \leq y < 0.50)$, it is preferably $(0 \leq y < 0.40)$, and more preferably $(0 \leq y < 0.30)$.

When y is larger than this range, high charge voltage properties which $LiCoO_2$ possesses and high energy density properties following them are impaired.

On the other hand, as described previously, though the range of z is $(-0.10 \leq z \leq 0.20)$, it is preferably $(-0.08 \leq z \leq 0.18)$, and more preferably $(-0.06 \leq z \leq 0.16)$. When z is smaller than this range or larger than this range, the discharge capacity tends to be reduced.

The coating layer of the positive electrode active material is provided on at least a part of the composite oxide particle (core particle) and composed of an oxide containing lithium (Li) and at least one coating element of nickel (Ni) and manganese (Mn). As described previously, by providing this coating layer, it is possible to realize high charge voltage properties and high energy density properties following them and to enhance charge-discharge cycle properties under a high charge-discharge voltage condition.

A constitutional ratio of nickel (Ni) and manganese (Mn) in the coating layer is preferably in the range of from 100/0 to 30/70, and more preferably in the range of from 100/0 to 40/60 in terms of a molar ratio. This is because when the amount of manganese (Mn) is increased exceeding this range, occlusion properties of lithium (Li) are reduced, thereby finally causing a lowering of the capacity of the positive electrode active material and an increase of electric resistance when used for a battery. Also, this constitutional ratio of nickel (Ni) and manganese (Mn) is a range exhibiting effectiveness for suppressing the progress of sintering between the particles in sintering a precursor thereof further including lithium (Li).

Also, a part of nickel (Ni) and manganese (Mn) in the oxide of the coating layer can be substituted with at least one metal element selected from the group consisting of magnesium (Mg), aluminum (Al), boron (B), titanium (Ti), vanadium (V), chromium (Cr), iron (Fe), cobalt (Co), copper (Cu), zinc (Zn), molybdenum (Mo), tin (Sn), calcium (Ca), strontium (Sr), tungsten (W), yttrium (Y) and zirconium (Zr).

According to this, stability of the positive electrode active material and diffusibility of the lithium ion can be enhanced. The amount of substitution of the selected metal element is, for example, not more than 40% by mole, preferably not more than 30% by mole, and more preferably not more than 20% by mole relative to the total amount of nickel (Ni) and manganese (Mn) of the oxide of the coating layer. This is because when the amount of substitution of the selected metal element is increased exceeding this range, occlusion properties of lithium (Li) are lowered, and the capacity of the positive electrode active material is lowered.

Also, the amount of the coating layer is, for example, from 0.5% by weight to 50% by weight, preferably from 1.0% by weight to 40% by weight, and more preferably from 2.0% by weight to 35% by weight relative to 100% by weight of the composite oxide particle. This is because when the coating weight of the metal oxide is increased exceeding this range, the capacity of the positive electrode active material is lowered. This is also because when the coating weight of the metal oxide is lower than this range, stability of the positive electrode active material is lowered.

The positive electrode mixture layer 2B may contain a conductive agent as the need arises. Examples of the conductive agent which can be used include carbon materials, for example, acetylene black, graphite, ketjen black, etc.

[Binder]

The positive electrode mixture layer 2B contains a binder. In an embodiment, it is necessary to use a polyacrylonitrile based resin-containing binder, and a binder containing an acrylonitrile unit entirely or partially is useful.

As the binder component other than the polyacrylonitrile based resin, polyvinylidene fluoride or a copolymer of vinylidene fluoride or a modified product thereof can be contained as a part thereof. A concentration of the polyacrylonitrile based resin to be contained in the binder is desirably 0.2% or more in terms of a mass ratio.

In an embodiment, the polyacrylonitrile in the binder to be contained in the positive electrode mixture layer 2B is crosslinked and carbonized. According to this, adhesion of the positive electrode mixture is enhanced, peeling of the positive electrode mixture layer from the collector can be prevented, and in particular, cycle properties of the battery at the time of high-load charge and discharge can be enhanced. As described previously, the crosslinking and carbonization of the polyacrylonitrile can be carried out by, for example, coating a positive electrode mixture slurry on a collector and then heat treating the coated collector at a temperature in the range of from 180° C. to 230° C.

More specifically, examples of the copolymer of vinylidene fluoride include a vinylidene fluoride-hexafluoropropylene copolymer, a vinylidene fluoride-tetrafluoroethylene copolymer, a vinylidene fluoride-chlorotrifluoroethylene copolymer and a vinylidene fluoride-hexafluoropropylene-tetrafluoroethylene copolymer. Copolymers obtained by further copolymerizing the above-exemplified copolymer with other ethylenically unsaturated monomer can be exemplified.

More specifically, examples of the copolymerizable ethylenically unsaturated monomer include acrylic esters, methacrylic esters, vinyl acetate, acrylonitrile, acrylic acid, methacrylic acid, maleic anhydride, butadiene, styrene, N-vinylpyrrolidone, N-vinylpyridine, glycidyl methacrylate, hydroxyethyl methacrylate and methyl vinyl ether.

As to the binder to be used in an embodiment according to the present invention, it is preferable from the viewpoint of flexibility that the polyacrylonitrile based resin is a copolymer of acrylonitrile and an acrylate, in other words, one containing an acrylate unit. When an acrylate is contained, crystallinity of the resin is lowered, whereby the flexibility is improved. As the acrylate unit, 2-ethylhexyl acrylate or one having an ethylene glycol chain is preferable.

The polymers as described above contained in the binder may be used alone or as an admixture of two or more of them.

The content of the binder in the positive electrode mixture layer 2B is preferably in the range of 1% by mass or more and not more than 7% by mass, and more preferably in the range of 1.5% by mass or more and not more than 3.5% by mass. When the content of the binder is too low, binding properties are not sufficient so that it is difficult to bind the positive electrode active material or the like to the positive electrode collector 2A. On the other hand, when the content of the binder is too high, a binder component with low electron conductivity and ionic conductivity coats the positive electrode active material so that the charge-discharge efficiency tends to be lowered.

[Negative Electrode]

The negative electrode 3 can be obtained by coating a negative electrode mixture obtained by mixing a negative electrode active material, a conductive agent, a binder and the like on the surface of the negative electrode collector 3A to provide the negative electrode mixture layer 3B.

Here, examples of the negative electrode active material which can be used include carbon materials, metal compounds, oxides, sulfides, lithium nitrides such as $LiN_3$, a lithium metal, metals capable of forming an alloy together with lithium and polymer materials.

Examples of the carbon material which can be used include hardly graphitized carbon, easily graphitized carbon, graphite, pyrolytic carbons, cokes, vitreous carbons, organic polymer compound burned materials, carbon fibers and active carbon. Here, examples of the cokes include pitch coke, needle coke and petroleum coke.

The organic polymer compound burned material as referred to herein refers to a material obtained through carbonization by baking a polymer material such as phenol resins and furan resins at an appropriate temperature, and a part thereof is classified into hardly graphitized carbon or easily graphitized carbon. Also, examples of the polymer material include polyacetylene and polypyrrole.

Of these negative electrode materials capable of doping and dedoping lithium, those having a charge-discharge potential relatively close to a lithium metal are preferable. This is because the lower the charge-discharge potential of the negative electrode, the easier the attainment of a high energy density of the battery.

Above all, the carbon material is preferable because a change in the crystal structure to be generated at the time of charge and discharge is very small, a high charge-discharge capacity can be obtained, and good cycle properties can be obtained. In particular, graphite is preferable because its electrochemical equivalent is large, and a high energy density can be obtained. Furthermore, hardly graphitized carbon is preferable because excellent properties are obtainable.

Also, as the negative material capable of doping and dedoping lithium, a lithium metal single body and a single body, an alloy or a compound of a metal element or a semiconductor capable of forming an alloy together with lithium can be preferably used. In particular, the joint use of such a material with the carbon material is more preferable because not only a high energy density can be obtained, but excellent cycle properties can be obtained.

In an embodiment according to the present invention, the alloy includes alloys containing at least one metal element and at least one semi-metal element in addition to alloys composed of two or more metal elements. Examples of its texture include a solid solution, a eutectic (eutectic mixture), an intermetallic compound and one in which two or more thereof coexist.

Examples of the metal element or semi-metal element include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y) and hafnium (Hf).

Examples of such an alloy or compound include those represented by a chemical formula: $Ma_sMb_tLi_u$ or a chemical formula: $Ma_pMc_qMd_r$. In these chemical formulae, Ma represents at least one member of metal elements and semi-metal elements capable of forming an alloy together with lithium; Mb represents at least one member of metal elements and semi-metal elements other than lithium and Ma; Mc represents at least one member of non-metal elements; and Md represents at least one member of metal elements and semi-metal elements other than Ma. Also, the values of s, t, u, p, q and r are $s>0$, $t\geq 0$, $u\geq 0$, $p>0$, $q>0$ and $r\geq 0$, respectively.

Above all, a single body, an alloy or a compound of a metal element or a semi-metal element belonging to the Group 4B of the short form of the periodic table is preferable; and silicon or tin or an alloy or a compound thereof is especially preferable. These materials may be crystalline or amorphous.

The conductive agent for the negative electrode is not particularly limited so far as it is an electron conductive material. Examples thereof include graphites, for example, artificial graphite, expandable graphite, etc.; carbon blacks, for example, acetylene black, ketjen black, channel black, furnace black, etc.; conductive fibers, for example, carbon fibers, metal fibers, etc.; metal powders of, for example, copper, nickel, etc.; and organic conductive materials, for example, polyphenylene derivatives, etc. The conductive may be used singly or in admixture.

Of these conductive agents, acetylene black, ketjen black and carbon fibers are especially preferable. The content of the conductive agent is preferably from 0.1 to 30 parts by weight, and more preferably from 0.5 to 10 parts by weight based on 100 parts by weight of the negative electrode active material.

[Electrolyte]

As the electrolyte, a non-aqueous electrolytic solution having an electrolyte salt dissolved in a non-aqueous solvent can be used. As the non-aqueous solvent, for example, it is preferable that at least one of ethylene carbonate and propylene carbonate is contained from the standpoint of the matter that cycle properties can be enhanced. Also, a non-aqueous solvent containing a mixture of ethylene carbonate and propylene carbonate is preferable from the standpoint of the matter that cycle properties can be more enhanced.

Furthermore, as thlive electrode active material, the negative electrode active material, the conductive agent, the binder and the like, which are separated from the positive electrode 2 or the negative electrode 3, do not permeate thereinto. Specifically, for example, the pore size of the separator 4 is preferably from 0.01 to 1 μm.

Moreover, a thickness of the separator 4 is preferably from 10 μm to 300 μm, and more preferably from 15 μm to 30 μm. Also, a porosity of the separator 4 is determined depending upon the permeability of electron or ion, the raw material and the film thickness. The porosity of the separator 4 is preferably from 30% to 80%, and more preferably from 35% to 50%.

Next, the manufacturing method of the lithium ion secondary battery according to the First Embodiment is hereunder described.

The positive electrode 2 is prepared in the following manner. For example, a positive electrode active material, a conductive agent and a binder are mixed to prepare a positive electrode mixture, and this positive electrode mixture is dispersed in a solvent, for example, 1-methyl-2-pyrrolidone, etc. to prepare a positive electrode mixture slurry.

Subsequently, this positive electrode mixture slurry is coated on the conductive layer-provided positive electrode collector 2A; the solvent is dried; the resulting positive electrode collector 2A is subjected to compression molding by a roll press, etc. to form the positive electrode active material 2B. There is thus prepared the positive electrode 2.

Subsequently, the positive electrode 2 is heated in a nitrogen atmosphere in a state that the positive electrode active material layer 2B is wound around the roll. From the viewpoint of accelerating crosslinking of PAN, it is preferable that heating is carried out at a temperature of from 180 to 230° C. in a nitrogen atmosphere.

The negative electrode 3 is prepared in the following manner. For example, a negative electrode active material and a binder are mixed to prepare a negative electrode mixture, and this negative electrode mixture is dispersed in a solvent, for example, 1-methyl-2-pyrrolidone, etc. to prepare a negative electrode mixture slurry.

Subsequently, this negative electrode mixture slurry is coated on the negative electrode collector 3A; the solvent is dried; the resulting negative electrode collector 3A is subjected to compression molding by a roll press, etc. to form the negative electrode active material 3B. There is thus prepared the negative electrode 3.

Then, the positive electrode lead 13 is installed in the positive electrode collector 2A by, for example, welding; and a negative electrode lead 14 is installed in the negative electrode collector 3A by, for example, welding. Subsequently, the positive electrode 2 and the negative electrode 3 are wound via the separator 4; a tip of the positive electrode lead 13 is welded to the safety valve mechanism 8; a tip of the negative electrode lead 14 is welded to the battery can 1; and the wound positive electrode 2 and the negative electrode 3 are interposed between a pair of the insulating plates 5 and 6 and contained in the inside of the battery can 1.

Subsequently, an electrolytic solution is injected into the inside of the battery can 1, thereby impregnating the separator 4 with the electrolytic cell. Subsequently, the battery lid 7, the safety valve mechanism 8 and the temperature coefficient element 9 are fixed to the open end of the battery can 1 via the gasket 10 by caulking. There is thus prepared the lithium ion secondary battery according to the First Embodiment.

According to the First Embodiment, in the lithium ion secondary battery for carrying out the charge-discharge cycle at a high charge voltage of 4.25 V or more and not more than 4.55 V, good cycle properties can be obtained by using polyacrylonitrile as the binder and heating the positive electrode mixture at a temperature of, for example, 180° C. or higher and not higher than 230° C. to modify (crosslink and carbonize) the polyacrylonitrile.

Second Embodiment

Figure 3:
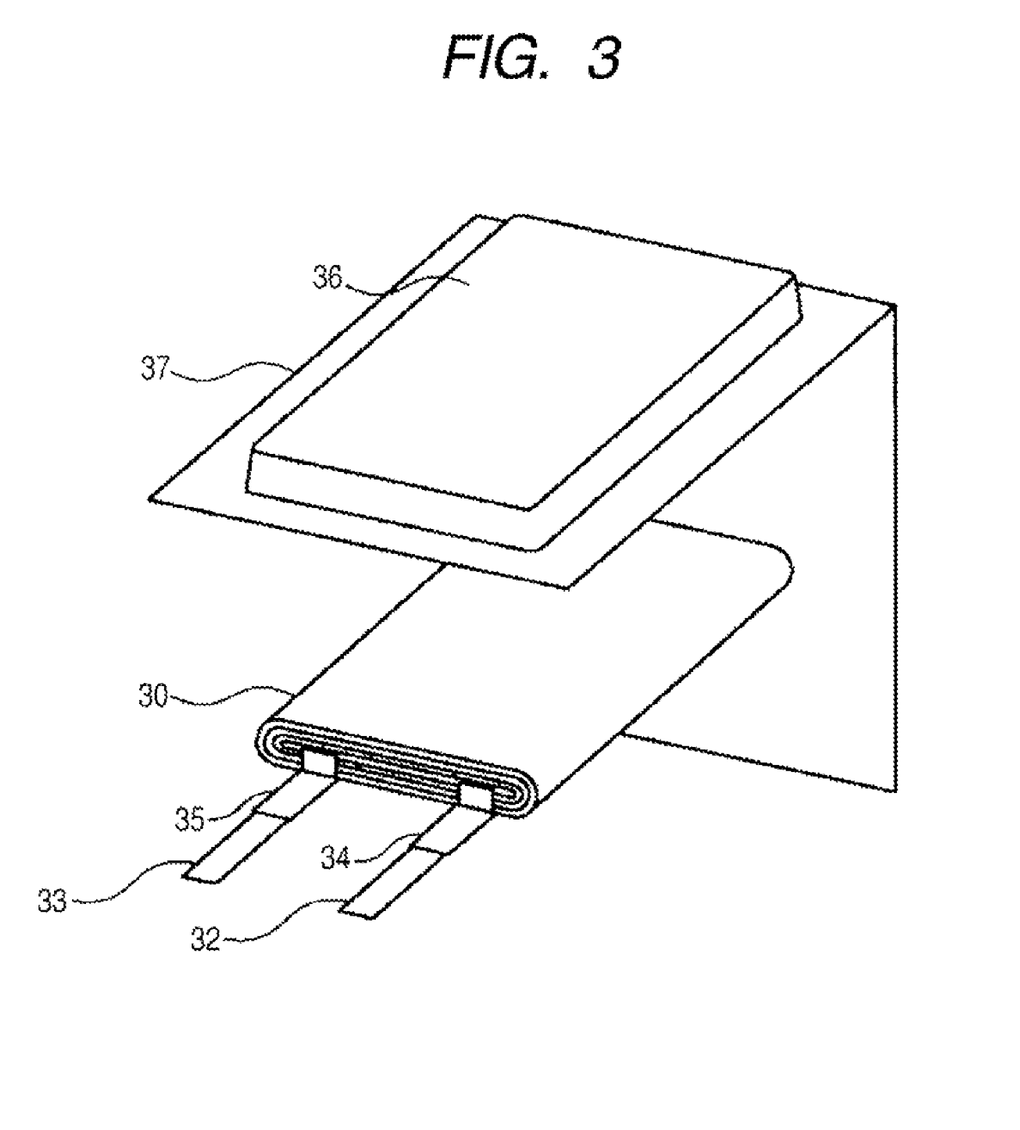
FIG. 3 is a vertical cross-sectional view showing a Second Embodiment of a lithium ion secondary battery according to an embodiment.

FIG. 3 is a perspective view showing a structure of a lithium ion secondary battery according to a Second Embodiment. As illustrated in FIG. 3, this lithium ion secondary battery is prepared by containing a battery element 30 in an armoring material 37 composed of a moistureproof laminate film and sealing the circumference of the battery element 30 by welding.

The battery element 30 is provided with a positive electrode lead 32 and a negative electrode lead 33, and these leads are interposed by the armoring material 37 and led out to the outside. In order to enhance the adhesiveness to the armoring material 37, a resin piece 34 and a resin piece 35 are coated on the both surfaces of each of the positive electrode lead 32 and the negative electrode lead 33, respectively.

The armoring material 37 has, for example, a laminated structure in which an adhesive layer, a metal layer and a surface protective layer are successively laminated.

Here, the adhesive layer is composed of a polymer film. Examples of a material constituting this polymer film include polypropylene (PP), polyethylene (PE), cast polypropylene (CPP), linear low density polyethylene (LLDPE) and low density polyethylene (LDPE).

The metal layer is composed of a metal foil. Examples of a material constituting this metal foil include aluminum (Al). However, metals other than aluminum can also be used.

Examples of a material constituting the surface protective layer include nylon (Ny) and polyethylene terephthalate (PET). The surface on the side of the adhesive layer is a surface on the side for containing the battery element 30 therein.

Figure 4:
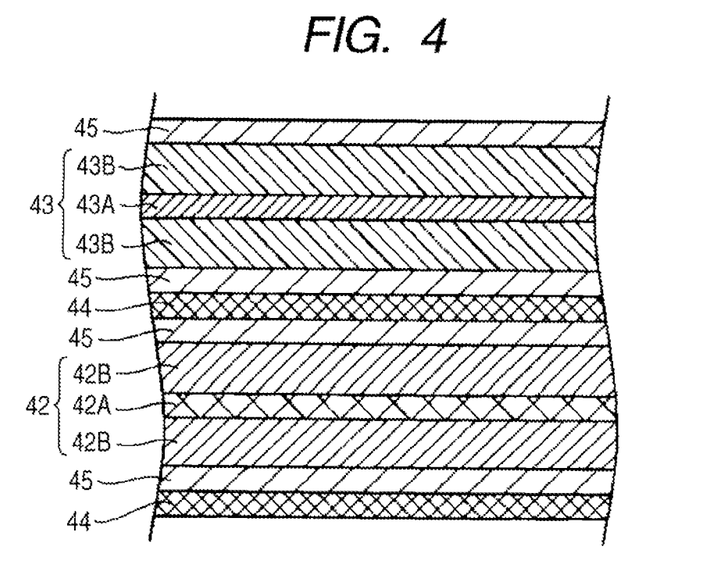
FIG. 4 is an enlarged cross-sectional view of a part of the battery element as illustrated in FIG. 1.

As illustrated in FIG. 4, the battery element 30 is, for example, a winding type battery element 30 in which a strip-shaped negative electrode 43 having a gel electrolyte layer 45 provided on the both surfaces thereof, a separator 44, a strip-shaped positive electrode layer 42 having a gel electrolyte layer 45 provided on the both surfaces thereof and a separator 44 are laminated, and the laminate is wound in a longitudinal direction.

The positive electrode 42 is composed of a strip-shaped positive electrode collector 42A and a positive electrode mixture layer 42B formed on the both surfaces of this positive electrode collector 42A. The positive electrode collector 42A is a metal foil composed of, for example, aluminum (Al). The positive electrode mixture layer 42B is the same as in the positive electrode mixture layer 2B of the foregoing First Embodiment.

In one end of the positive electrode 42 in a longitudinal direction, the positive electrode lead 32 is connected by, for example, spot welding or ultrasonic welding. As a material of this positive electrode lead 32, a metal, for example, aluminum, etc. can be used.

The negative electrode 43 is composed of a strip-shaped negative electrode collector 43A and a negative electrode mixture layer 43B formed on the both surfaces of this negative electrode collector 43A. The negative electrode collector 43A is configured of a metal foil, for example, a copper (Cu) foil, a nickel foil, a stainless steel foil, etc.

Similar to the positive electrode 42, in one end of the negative electrode 43 in a longitudinal direction, the negative electrode lead 33 is connected by, for example, spot welding or ultrasonic welding. As a material of this negative electrode lead 33, a metal, for example, copper (Cu), nickel (Ni), etc. can be used.

Since the layers other than the gel electrolyte layer 45 are the same as those in the foregoing First Embodiment, the gel electrolyte layer 45 is hereunder described.

The gel electrolyte layer 45 contains an electrolytic solution and a polymer compound which is a supporting body for supporting this electrolytic solution and is formed in a so-called gel state. The gel electrolyte layer 45 is preferable because not only high ionic conductivity can be obtained, but the battery can be prevented from the occurrence of liquid leakage. The constitution of the electrolytic solution is the same as in the First Embodiment.

Examples of the polymer compound include polyacrylonitrile, polyvinylidene fluoride, a copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polystyrene and polycarbonate. Of these, polyacrylonitrile, polyvinylidene fluorine, polyhexafluoropropylene and polyethylene oxide are especially preferable from the standpoint of electrochemical stability.

Next, the manufacturing method of the lithium ion secondary battery according to the Second Embodiment is hereunder described.

First of all, a precursor solution containing a solvent, an electrolyte salt, a polymer compound and a mixed solvent is coated on each of the positive electrode 42 and the negative electrode 43, and the mixed solvent is volatilized to form the gel electrolyte layer 45. The positive electrode lead 32 is previously installed in an end of the positive electrode collector 42A by welding, and the negative electrode lead 33 is also previously installed in an end of the negative electrode collector 43A by welding.

Subsequently, the positive electrode 42 and the negative electrode 43 on each of which is formed the gel electrolyte layer 45 are laminated via the separator 44 to form a laminate, and this laminate is wound in a longitudinal direction to form the winding type battery element 30.

Then, the armoring material 37 composed of a laminate film is subjected to deep drawing to form a recess 36. The wound electrode body is inserted into this recess 36; an unprocessed portion of the armoring material 37 is turned up in an upper part of the recess 36; and an outer periphery of the recess 36 is then sealed by hot welding. There is thus prepared the lithium ion secondary battery according to the Second Embodiment.

EXAMPLES

An embodiment is hereunder described in more detail with reference to the following Examples. Further, the examples should not be construed as limiting the present application.

(1) Preparation of Positive Electrode:

(1-1) Preparation of Positive Electrode Active Material:

In preparing a coating layer-provided positive electrode active material on the surface of a core particle, first of all, a lithium-cobalt composite oxide ($LiCo0.98Al_{0.01}Mg_{0.01}O_2$, hereinafter referred to as "positive electrode material I") which became a core particle was synthesized.

That is, LiOH and a coprecipitated hydroxide represented by $Co_{0.98}Al_{0.01}Mg_{0.01}(OH)_2$ were mixed in a ratio of Li to all transition metals of 1/1 (by mole) in a mortar.

This mixture was heat treated in an air atmosphere at 800° C. for 12 hours and pulverized to obtain a lithium-cobalt composite oxide A ($LiCo_{0.98}Al_{0.01}Mg_{0.01}O_2$) having a BET specific surface area of 0.44 $m^2$/g and an average particle size of 6.2 μm) and a lithium-cobalt composite oxide B ($LiCo_{0.98}Al_{0.01}Mg_{0.01}O_2$) having a BET specific surface area of 0.20 $m^2$/g and an average particle size: 16.7 μm.

These lithium-cobalt composite oxides A and B were mixed in a ratio of 85/15 to obtain a positive electrode active material I. The X-ray diffraction analysis by CuKα revealed that the positive electrode active material I had an R-3 rhombohedral layered rock salt structure.

Next, the above synthesized positive electrode active material I, nickel oxide having an average particle size of 1 μm and manganese oxide having the same average particle size were mixed in a ratio of 96/2/2 (by mass) and dry mixed utilizing a mechano fusion system, manufactured by Hosokawa Micron Corporation, thereby coating nickel oxide and manganese oxide on the positive electrode active material I.

Next, the resulting positive electrode active material I was baked in air at 950° C. for 10 hours to obtain a positive electrode active material having a structure in which a coating layer containing Li and an oxide containing Ni and Mn was deposited on the surface of the positive electrode active material I.

(1-2) Formation of Positive Electrode Mixture Layer:

Next, the above-synthesized positive electrode active material having an average particle size of 11.4 μm, ketjen black (KB), a copolymer obtained by copolymerizing an acrylate with polyacrylonitrile (PAN) and polyvinylidene fluoride (PVDF) were mixed in a mass ratio of 94/3/2/1, to which was then added N-methyl-pyrrolidone, and the mixture was kneaded to prepare a positive electrode mixture slurry.

Next, the thus prepared positive electrode mixture slurry was coated on one surface of an aluminum collector having a thickness of 20 μm in a coverage of the mixture of 28 g/cm$^3$ and then dried at 80° C. Next, the resulting aluminum collector was punched out into a circle of ϕ15 and pressed at 2,000 kPa by a roll press.

Furthermore, volatile components such as the residual solvent and the adsorbed moisture were completely removed; and in order to crosslink and carbonize the polyacrylonitrile, the residue was treated in an $N_2$ atmosphere under a heating condition as shown in Table 1, thereby prepared a positive electrode according to each of the Examples and Comparative Examples.

(2) Preparation of Negative Electrode:

A granular artificial graphite negative electrode powder (BET specific surface area: 0.58 m$^2$/g), polyvinylidene fluoride and a vapor grown carbon fiber (VGCF, manufactured by Showa Denko K.K.) were mixed in a mass ratio of 96.5/2.5/1.0.

This mixture was then dispersed in N-methyl-pyrrolidone to form a slurry, which was then coated on a 10 μm-thick electrolytic copper foil in a volume density of the negative electrode mixture of 1.80 g/cm$^3$, and after drying, the N-methyl-pyrrolidone was removed.

Next, the resulting collector was pressed by a roll press and then punched out into a circle of ϕ16 to obtain a negative electrode. The roll pressing was carried out under a condition at 130° C. and 140 kgf. An initial charge-discharge efficiency of the negative electrode was 94%; and a discharge capacity of the negative electrode was 347 mAh/g.

(3) Preparation of Non-Aqueous Liquid:

A solution obtained by dissolving $LiPF_6$ as an electrolyte salt in a solvent obtained by mixing ethylene carbonate, dimethyl carbonate, ethylmethyl carbonate, vinylene carbonate and 4-fluoroethylene carbonate in a mass ratio of 22.5/65.5/611/5 was used as a non-aqueous electrolytic solution in a mass molar concentration of $LiPF_6$ of 1.5 moles/kg.

(4) Assembling of Battery:

The thus prepared positive electrode and negative electrode were combined with a separator having a thickness of 20 μm, to which was then added the thus prepared non-aqueous electrolytic solution, thereby preparing a coin type lithium ion secondary battery of each of the Examples and Comparative Examples.

(5) Evaluation of Battery Performance:

Next, each of the thus prepared coin cells was subjected to evaluation of battery performance in the following manners.

(5-1) Electrode Peel Strength:

As to a measurement method of peel strength of the electrode, an adhesive tape was stuck on the side of the positive electrode mixture, and a peel test was carried out at 180° C. A peel rate was set at 10 cm/min, and an average value by the two electrode mixture layers was calculated.

(5-2) Charge-Discharge Cycle Properties:

In the prepared lithium ion secondary battery, a charge-discharge cycle was measured. The charge was carried out in a constant current-constant voltage system. Specifically, charge was carried out at 1 mA until the charge voltage reached 4.35 V from the first cycle to the third cycle; and constant-voltage charge was carried out at that voltage; and charge was continued until the charge current dropped to 0.01 mA.

An open circuit time of 10 minutes was provided between charge and discharge, and discharge of 1 mA was carried out. Discharge of one cycle was accomplished at a point of time where the voltage dropped to 3.0 V. An initial efficiency (%) was defined as [{(discharge capacity at the first cycle)/(charge capacity at the first cycle)}×100]. After the third cycle, charge was carried out at 5.6 mA, and discharge was carried out at 4 mA. This operation was carried out 100 cycles, thereby evaluating an initial charge capacity (mAh/g), an initial charge-discharge efficiency (%) and a capacity retention at the 100th cycle (%), namely [{(discharge capacity at the 100th cycle)/(charge capacity at the 100th cycle)}×100].

The peel strength of positive electrode after pressing and evaluation results of battery performance regarding each of the Examples and Comparative Examples are summarized and shown in Table 1.

TABLE 1

| | Positive electrode | | | Battery performance | | |
|---|---|---|---|---|---|---|
| Section | Heat treatment condition | Peel strength (mN/mm) | Presence or absence of crosslinking and carbonization | Initial capacity (mAh/mm) | Initial efficiency (%) | Capacity retention at the 100th cycle (%) |
| Comparative Example 1 | Nil | 33 | No | 170.6 | 93.4 | 60 |
| Comparative Example 2 | 130° C. | 40 | No | 171.5 | 93.5 | 72 |
| Comparative Example 3 | 150° C. | 51 | No | 172.0 | 94.1 | 79 |
| Example 1 | 180° C. | 87 | Yes | 169.8 | 93.2 | 85 |
| Example 2 | 230° C. | 103 | Yes | 170.6 | 93.5 | 92 |

As shown in Table 1, the capacity retention at 4.35 V of the battery of each of the Examples is higher than that of the battery of each of the Comparative Examples. Here, Comparative Example 1 is concerned with a battery using a positive electrode obtained by using a PAN based resin as the binder and performing no heat treatment; Comparative Example 2 is concerned with a battery using a positive electrode obtained by performing the heat treatment at 130° C.; Comparative Example 3 is concerned with a battery using a positive electrode obtained by performing the heat treatment at 150° C.; Example 1 is concerned with a battery using a positive electrode obtained by performing the heat treatment at 180° C.; and Example 2 is concerned with a battery using a positive electrode obtained by performing the heat treatment at 230° C. Therefore, it is understood that in case of heat treating the positive electrode mixture at a high temperature of 180° C. or higher, the capacity retention is high.

In the light of the above, it has been confirmed that by heat treating PAN and crosslinking and carbonizing it, the peel strength of the positive electrode mixture is enhanced, peeling and deterioration of the collector and the mixture as an inherent problem at the high charge voltage are suppressed, and cycle properties are enhanced.

As a reason why the peel strength was enhanced, it is estimated that the crystallinity of the binder resin was enhanced due to crosslinking, and the binding properties between the mixture and the aluminum collector were enhanced. Also, as one of reasons why the cycle properties were enhanced, it is estimated that the carbonization was accelerated, whereby the conductivity of the electrode was enhanced.

Figure 5:
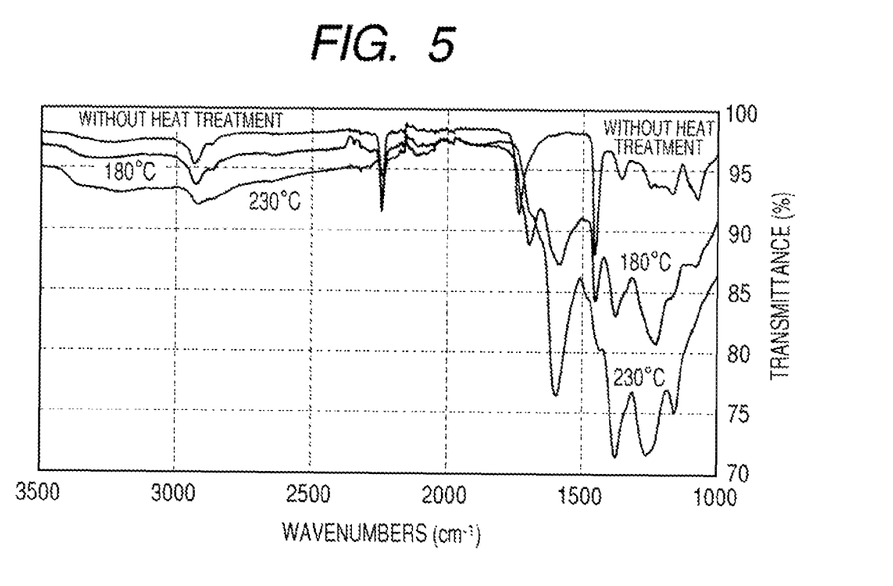
FIG. 5 is a graph showing FT-IR measurement results of a PAN resin before and after a heat treatment.

FT-IR measurement results of the PAN resin after the heat treatment are shown in FIG. 5. It is understood that because of the heat treatment, a peak at 2,240 cm$^{-1}$ is decayed, whereas a peak newly appears at 1,600 cm$^{-1}$. According to this, it is possible to determine the carbonization and crosslinking.

For example, the lithium ion secondary battery according to an embodiment includes a positive electrode, a negative electrode, a non-aqueous electrolytic solution and a separator for partitioning the positive electrode and the negative electrode from each other. Its shape is not particularly limited but may be a cylindrical type, a rectangular type, a coin-shaped type, a button-shaped type or the like. Also, the lithium ion secondary battery may be configured to further include a current shutdown mechanism for shutting down a current within the battery corresponding to an increase of the inner pressure of the battery at the abnormal time, for example, the time of over charge, thereby devising to enhance the safety.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A positive electrode comprising:
a collector; and
a positive electrode mixture layer formed on the collector and containing a polyacrylonitrile based resin-containing binder and a positive electrode active material, wherein:
the polyacrylonitrile in the positive electrode mixture layer is crosslinked and carbonized; and
the content of the binder in the positive electrode mixture layer is greater than or equal to 1% by mass and less than or equal to 7% by mass.

2. The positive electrode according to claim 1, wherein the polyacrylonitrile based resin is a copolymer with an acrylate.

3. The positive electrode according to claim 1, wherein the positive electrode active material in the positive electrode mixture is provided with a coating layer composed of an oxide containing Li and at least one of Ni and Mn on at least a part of a composite oxide particle containing at least Li and Co.

4. A lithium ion secondary battery comprising:
a positive electrode;
a negative electrode; and
an electrolyte, wherein:
the positive electrode includes a collector and a positive electrode mixture layer formed on the collector and containing a polyacrylonitrile based resin-containing binder and a positive electrode active material, and the polyacrylonitrile in the positive electrode mixture layer is crosslinked and carbonized; and
the content of the binder in the positive electrode mixture layer is greater than or equal to 1% by mass and less than or equal to 7% by mass.

5. The lithium ion secondary battery according to claim 4, wherein an open circuit voltage per single cell in a fully charged state is 4.25 V or more and not more than 4.55 V.

6. The positive electrode according to claim 1, wherein the polyacrylonitrile is carbonized at a temperature ranging from about 180° C. to about 230° C.

7. The lithium ion secondary battery according to claim 4, wherein the polyacrylonitrile is carbonized at a temperature ranging from about 180° C. to about 230° C.

8. The positive electrode according to claim 1, wherein the positive electrode active material comprises:
a core particle having the formula $Li_{(1+x)}Co_{(1-y)}M_yO_{(2-z)}$ where M represents at least one element selected from the group consisting of magnesium (Mg), aluminum (Al), boron (B), titanium (Ti), vanadium (V), chromium (Cr), manganese (Mn), iron (Fe), nickel (Ni), copper (Cu), zinc (Zn), molybdenum (Mo), tin (Sn), calcium (Ca), strontium (Sr), tungsten (W), yttrium (Y) and zirconium (Zr); $-0.10 \leq x \leq 0.10$; $0.1 \leq y < 0.50$; and $-0.10 \leq z \leq 0.20$; and
and a coating layer formed on the core particle, the coating layer composed of an oxide comprising lithium, nickel and manganese.

9. The lithium ion secondary battery according to claim 4, wherein the positive electrode active material comprises:
a core particle having the formula $Li_{(1+x)}Co_{(1-y)}M_yO_{(2-z)}$ where M represents at least one element selected from the group consisting of magnesium (Mg), aluminum (Al), boron (B), titanium (Ti), vanadium (V), chromium (Cr), manganese (Mn), iron (Fe), nickel (Ni), copper (Cu), zinc (Zn), molybdenum (Mo), tin (Sn), calcium (Ca), strontium (Sr), tungsten (W), yttrium (Y) and zirconium (Zr); $-0.10 \leq x \leq 0.10$; $0.1 \leq y < 0.50$; and $-0.10 \leq z \leq 0.20$; and
and a coating layer formed on the core particle, the coating layer composed of an oxide comprising lithium, nickel and manganese.

* * * * *

UNITED STATES PATENT AND TRADEMARK OFFICE
CERTIFICATE OF CORRECTION

PATENT NO.           : 7,951,491 B2
APPLICATION NO.      : 12/263985
DATED                : May 31, 2011
INVENTOR(S)          : Takashi Tokunaga et al.

It is certified that error appears in the above-identified patent and that said Letters Patent is hereby corrected as shown below:

ON THE TITLE PAGE OF THE PATENT:

Change item [75] Inventor, Toshikazu Nakaura to "Toshikazu Nakamura".

Signed and Sealed this
Twenty-seventh Day of September, 2011

David J. Kappos
*Director of the United States Patent and Trademark Office*